Oct. 20, 1970  G. P. GASAWAY  3,535,180
METHOD OF MAKING REINFORCED PLASTIC SHEETING
Filed Feb. 28, 1967
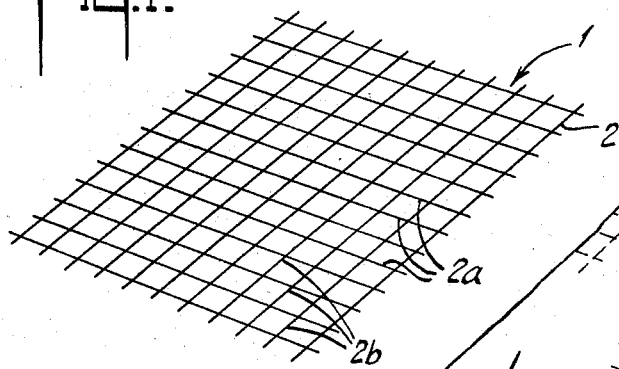
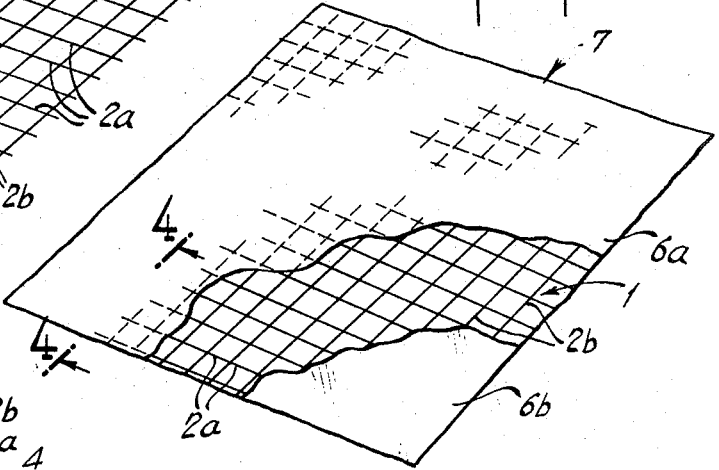
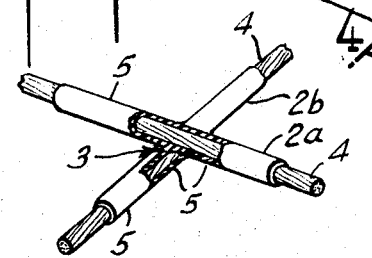
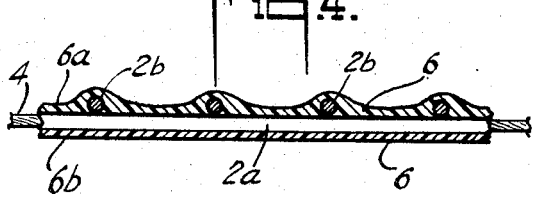
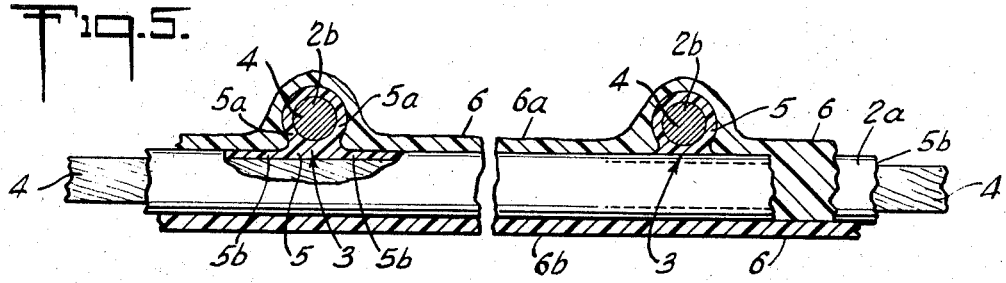
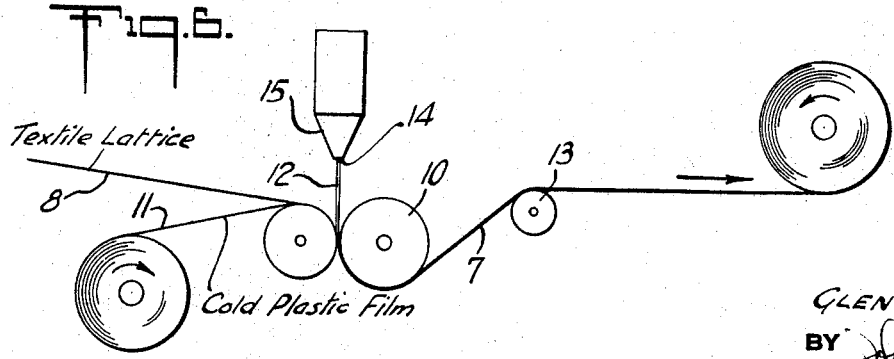
INVENTOR
GLEN P. GASAWAY
BY
ATTORNEY

United States Patent Office 3,535,180
Patented Oct. 20, 1970

3,535,180
METHODS OF MAKING REINFORCED PLASTIC SHEETING
Glen P. Gasaway, Buford, Ga., assignor to Johnson & Johnson, a corporation of New Jersey
Filed Feb. 28, 1967, Ser. No. 619,309
Int. Cl. B32b 5/08
U.S. Cl. 156—178    4 Claims

ABSTRACT OF THE DISCLOSURE

Plastic sheet material comprising a textile lattice of coated intersecting yarns which are coating-fused at their intersections and are engulfed by layers of plastic materials on both sides to provide an essentially moisture-impervious reinforced laminated structure, and improved methods of making the same.

---

This invention resides in a plastic sheeting reinforced by an internal network of traversing coated yarns fused at their points of intersection.

Many reinforced sheet materials have been developed for utilization as barriers against the weather, and specifically as moisture barrier guards in many areas. Additionally, such sheeting has been visualized as a barrier guard against the elements of nature where no truly dependable guard now exists for certain contemplated uses, especially in the construction field.

Of the many products that have been produced for these intended purposes, it has been found that each has been lacking in one or more of the properties defined by a bursting strength, water impermeability, tear resistance and tensile strength, where these properties are factors combining to provide the needs and requirements of sheeting materials of this nature.

These and other problems have been overcome by the instant invention which furnishes a textile lattice of traversing thermoplastic coated yarns, coating-fused at their points of intersection, said lattice being integrally engulfed by a plastic layer to provide an essentially moisture impervious, reinforced plastic sheet having a burst strength of at least about 130 pounds per square inch.

"Textile lattice" as used herein shall mean both woven textile fabric where warp and filling yarns are interlaced, e.g., scrim or gauze, and unwoven mats or layers where a first set of yarns having each yarn arranged in a spaced, parallel relationship, is positioned under or on top of a second set of yarns arranged in a similar manner such that the yarn of one set is angularly disposed with respect to the yarns of the second set. The constructions of the woven fabrics shall range from about 4 x 4 to about 20 x 20 to provide an "open construction" and the mats or layers of unwoven crosslaid yarns shall have equally "open" construction ranges.

Construction of less than 4 x 4 are too open to contribute less than the minimum values for the essential physical characteristics such as tensile and bursting strengths which are required of the reinforced plastic sheet of fabric of this invention, and constructions of greater than 20 x 20 are too tight to allow the plastic layer engulfing the textile lattice to enter the interstice between adjacent yarns to insure intimate contact between the plastic layer and the coated yarns along the entire surface area of each yarn. Thus, constructions tighter than 20 x 20 allow the formation of voids within the plastic layer. The formation of such voids would encourage yarn movement within the plastic sheeting and thus act to diminish the over-all burst strength of the sheeting. Such a circumstance would also contribute to localized reduction in tear strength and tensile strength and thus reduce the overall effectiveness of the sheet to a value below that desired and that which is characteristic of this invention.

The yarns forming the textile lattice of this invention must have a tensile strength of at least about 40,000 p.s.i. and must be constructed of synthetic or metallic filaments having a breaking tenacity in the wet state of at least about 5 pounds when tested in accordance with ASTM D578. The yarn used herein should be resistant to solutions of most acids and alkalies, should not be affected by common organic solvents and must be resistant to attack by mildew.

The invention will be more readily understood by reference to the following detailed description taken in conjunction with the attached drawing in which:

FIG. 1 is a plan view of one embodiment of a textile lattice of this invention,

FIG. 2 is a plan view of the reinforced plastic sheet of this invention broken away to show its construction, FIG. 3 is an enlarged view of two traversing coated yarns of this invention with sections broken away to show more revealing detail, FIG. 4 is an enlarged cross section taken along 4—4 of FIG. 3, FIG. 5 is an enlargement of FIG. 4 broken away to avoid unnecessary duplication, and FIG. 6 is a diagram illustrating steps in the process of making the product of this invention.

With specific reference to FIG. 1 there is shown a textile lattice 1 of traversing coated glass yarns 2, coating-fused at their points of intersection. The coated yarns 2 are seen to be divided into two sets, each set consisting of parallel, spaced yarns which are, in this instance, interwoven, i.e., the yarn of one set are interwoven with the yarn of the other set, to provide on open scrim of warp (one yarn set) and filling yarns (the other yarn set). The yarns consisting of the substantially equally spaced parallel yarns which define a first set of coated yarns 2a could equally as well be angularly positioned atop, or below, the second set of substantially equal spaced parallel coated yarns 2b which define the second set of yarns. The angle at which the yarns of either set cross of interlace is not important; however, it is preferred that the yarn of one set is positioned to traverse yarn of the other set at substantially right angles.

FIG. 3 is an enlargement showing two yarns 2a and 2b of the lattice 1 of FIG. 1 which traverse and are coating-fused at 3. The coated yarn 2 is seen to consist of a glass multifilament twisted yarn 4 coated with a plastic material 5 which in this instance shall be heat and ultraviolet light stabilized vinyl chloride. The yarns are each cut away in part at the point of intersection 3 to show the coating-fused nature of the bond effected between these two yarns at that point. Note that the fusion is between the coatings 5 on each yarn but that a width of yarn-coating plastic 5 separates the glass core yarn 4 of each coated yarn 2. This is very important and is essential to the instant invention.

The fusion of yarn coatings 5 of each coated yarn 2 at their points of intersection stabilizes the textile lattice 1 and prevents yarn movement to provide stability and strength to the lattice 1. The fact that the fusion is a coating-fusion is very important since it prevents intimate contact between the yarn 4 of each coated yarn 2. If such intimate contact of yarn 4 with yarn 4 was permitted, abrasion through use would soon cause severance of yarn at this point, resulting in failure of the reinforced sheeting of this invention.

FIG. 2 depicts the plastic sheet 7 of this invention in cutaway in order to show in detailed construction whereby the textile lattice 1 of FIG. 1 is integrally engulfed by plastic sheeting 6 which may consist of two films or sheets of plastic material 6a and 6b shown in cutaway here. The lattice 1 is a complete internal structure as to the sheeting 6 since the plastic sheeting spans each of the interstices between adjacent yarns 2 of the lattice 1 and completely envelopes each coated yarn 2 along its entire length and surface in a manner such as to preclude a space or void separating the surface of the coated yarn 2 from the plastic sheeting 6.

FIG. 4 is an enlarged cross section taken along line 4—4 of FIG. 2. The yarns 2a of one set are seen to traverse one yarn 2b of the other set of yarns in the textile lattice 1. The completeness of the coating of the plasitc sheeting 6 within the interstices between adjacent yarns is shown in detail.

FIG. 5 is the cross section of FIG. 4 much enlarged and broken away to avoid unnecessary duplication. Note that the glass core 4 of core yarn 2a is completely surrounded by an intimate uniform coating 5a of plastic material, e.g., polyvinyl chloride. The same is true of core yarn 2b which has the intimate coating 5b of polyvinylchloride film. Note also the nature and character of the coating-fused intersections between the traversing yarns 2a and 2b. There is a sufficient thickness of coating material 5 between the core of these traversing yarns to preclude contact between the glass cores 4 of these yarns. Also because of this coating-fusion, lateral or lengthwise movement of the yarns 2a or 2b is not permitted and strength and stability are built into the finished product.

Preferably the reinforced plantic sheeting 7 is produced via the process shown by FIG. 6 where a woven scrim 8 of coated glass yarn, coating-fused as shown in FIG. 2, and a thermoplastic sheet material 11 join in facewise engagement before the scrim enters the nip between rolls 9 and 10. Just prior to the entrance of sheet 11 and scrim 8 between the nip between the rolls 9 and 10, molten thermoplastic film-forming material 12 is deposited onto the surface of the scrim 8 as it forms a composite with sheet 11. The mass comprising the scrim 8, the sheet 11 and the layer of thermoplastic film-forming material then all pass between pressure rolls 9 and 10 and the latter press these components together with sufficient pressure to cause the molten thermoplastic material 12 to be fused directly to thermoplastic sheet 11, substantially entirely throughout each of the interstices between adjacent coated yarns 2 defining the scrim 8.

While pressure is being applied to the partially hardened thermoplastic film-forming material 12, it is further cooled by pressure roll 10 so that, in addition to being bonded to the thermoplastic material 12, it becomes further hardened so as to define (with sheet 11) a common plastic sheeting 6 completely engulfing the scrim 8. The reinforced plastic sheet 7 made up of the fused together thermoplastic film-forming material 12 and the thermoplastic sheet 11 which sandwich the woven scrim 8 is led from the cooling pressure roll 10 over an idler roll 13 as a finished product. The reinforced plastic sheeting may be wound up on a roll up winder 14, or the like.

The gauge, or the thickness, or the composite sheet material consisting of 11 and 12 depends upon the end use of the reinforced sheet material 7. However, merely by way of example, the gauge may be approximately 15 mils. As a minimum, there must be substantially uniform thickness of at least 8 mils spanning the interstices between adjacent yarn of the scrim and a thickness of at least about 15 mils of composite sheet material 11 and 12 covering the coating 5 of each yarn 2. Thus in the process shown via FIG. 2, the thermoplastic sheeting 11 must have a thickness of at least about 4 mils.

Pressure roll 9 has a resilient surface and is preferably made of rubber, e.g., foamed rubber. Pressure roll 10 is made of steel or some other suitable metal and is chilled by suitable means not shown. Each roll has a length predetermined according to the desired width of the finished product. Roll 9 is biased against roll 10 with sufficient pressure to cause the solid sheet of thermoplastic 11 to be forced against the already surface-cooled film or sheet of thermoplastic film-forming material 12 on pressure roll 10 during the hardening of the center portion of the film, after which it may be stripped from roll 10. By way of example, rolls 9 and 10 may exert a nip pressure in the neighborhood of thirty to sixty pounds per linear inch on the material passing between the rolls without extruding or squeezing out the freshly hardened film 12 from between roll 10 and the mesh fibers.

The substantially molten thermoplastic film-forming material 12, e.g., polyethylene, is "poured" or "extruded" in sheet or laminate form from an orifice 14 of a suitable linear nozzle or die, indicated generally by the reference numeral 15. In the case of polyethylene, as it leaves the orifice 14, it is at a temperature in the range of from 400°–500° F. and is therefore more fluid than solid but has a degree of tensile strength sufficient to maintain uniform surface in the absence of forming pressure. Extruder head 15 has an orifice 14 in the form of a slit of controlled width extending along the length of either rolls 9 or 10 and close to the surface of scrim 8. The illustration of FIG. 6 is schematic and the orifice 14 would normally be placed very near to the point of contact of film 12 with roll 10 for better control of film temperature.

It should be understood that the finished reinforced plastic sheeting 7 could be cast of two hot fluid sheets of thermoplastic material 12 engulfing the coated yarns of the textile lattice 1 by the use of two rolls such as 10 except that one roll must have a resilient surface to accommodate the mesh under pressure and prevent the formation of thin spots in the plastic sheeting 6a and 6b of FIG. 3 which would form at the points of yarn intersection if two hard surface rolls were used and to also preclude the possible destruction of the coating-fusion both at the yarn intersection and even the thinning or even the destruction of the yarn-coating thickness between intersecting yarns at points of yarn traversal in the lattice 1. The use of two rolls such as 9 is unsatisfactory since a flexible roll of foamed plastic or the like would not provide the very rapid cooling needed in a high speed process.

The synthetic coating 5 applied to the core yarn of glass (monofilament or multifilament), or metal multifilaments, or of other suitable materials, must have a melting point, or a softening point, sufficiently removed (below) the melting point of the core yarn 4, to permit the coating of the yarn without causing melting or surface tackiness of the core yarn 4 or of the filaments which compose it, such as to diminish the strength, flexibility, etc., of the yarn 2. Thus the yarn-coating material 5 must have a melting point below about 300° F. however, the melting point of this yarn-coating material must also be sufficiently higher than the melting point of the sheeting material 6 which engulfs the entire textile lattice, to permit its deposition on the textile lattice of coated yarn without destroying the integrity of the coating material 5, or seriously diminishing its thickness, which thickness shall be substantially uniform and within the range of from about 3 to about 5 mils.

The requirements of the yarn used herein were given earlier, and it has been stated that the yarn-coating material, which is applied by normal methods, e.g., extrusion coating, must have a melting temperature sufficiently below the melting point of the yarn it is to coat, and of the filaments comprising the yarn. This is necessary to prevent diminution of the strength, flexibility, etc., which are built into the yarn. However, this synthetic yarn-coating material must also have high strength, abrasion resistance, good resilience and flex life. The flex life is important since the yarn meeting the physical and chemical requirements specified herein will ordinarily have poor flex life and the yarn-coating material will act to contribute measurably to the flex life of the yarn it coats.

The yarn-coating material must have good abrasion resistance and strength since the core yarn must not be able to cut through their coatings to meet the exposed surface of the yarn it crosses at traversal points in the scrim. If this were to happen, the abrasion resulting through normal use of the reinforced plastic sheeting would cause severance of the core yarn at these points and the formation of weak spots dependent solely on the strength of the over-all plastic coating which contains or engulfs the textile lattice. The burst strength of the finished sheet at these points would be considerably lower than the minimum required herein.

Preferably, the yarn-coating material is chosen from the vinyl or the acrylic polymeric materials, but most preferably it is polyvinyl chloride.

The plastic materials 11 and 12 providing the overall cover or coating to the textile lattice, shall have a melting point, or melting points, below that of the yarn-coating material, i.e., below 300° F. These plastic textile lattice-coating materials must also be capable of providing a water impervious film or sheeting which is resistant to the action of fungi and other common organisms which would act to destroy or penetrate such a film and must also have a good flexibility since it contributes meaningfully to the flexibility of the reinforced plastic sheeting of this invention which is characterized as having a good flexibility. Of course, by varying the flexibility of the plastic materials, the flexibility of the reinforced sheet can be predicably altered. The reinforced plastic sheeting of this invention is capable of taking large strains without fracture and without excessive permanent deformation even at temperatures as low as 20° F. It should also have good abrasion resistance and good resistance to the transmission of an electrical current. It should also exhibit good resistance to weak acids and bases.

As has been mentioned, the plastic sheeting which coats and contains the textile lattice may be applied as a sandwich of two films (when heat is used to make either, or both, sheet tacky), where the lattice is between these two sheets, and the reinforced sheeting may also be formed by sandwiching the lattice between a sheet and a hot or molten thermoplastic film-forming material and cooling or by utilizing an application of a molten thermoplastic film-forming material to both surfaces of the film. However, the plastic sheet material used may be the same for coating both surfaces of the lattice or they may differ so long as they will fuse together strongly at a temperature significantly below the melting point of the yarn-coating material.

The plastic sheeting may tightly engulf the coated yarn forming the lattice without fusing to the surface of the yarn-coating material but, because of its tight and complete engulfment, on cooling it must remain completely contiguous to the yarn coating throughout the lattice, and thus strongly physically positioned and devoid of spaces between the yarn coating and the lattice sheeting. It may also fuse lightly to the outer surface of the yarn-coating material to provide a fusion bond. The nature of the relationship depends on the materials chosen. Polyethylene is preferred.

The reinforced plastic sheeting according to this invention is water impervious and not attacked by fungi. It has a burst strength of at least about 130 pounds per square inch (ASTM D774–63T), a tensile strength of at least about 85 pounds (ASTM D1682–64) and a tearing strength of at least about 7 pounds measured in the direction of either the warp or the fill (ASTM D39–61, Tongue Method). It also exhibits a water vapor transmission rate utilizing Procedure B of ASTM E–96–63T, i.e., 100% relative humidity one side of the sheet and 50% relative humidity at 73° F. on the other side of the sheet, of less than about 0.05 grain per hour per 100 square inches of sheeting and, utilizing Procedure E, i.e., 0% relative humidity on one side of the sheet and 90% relative humidity at 100° F. on the other side of the sheet of less than about 0.10 grain per hour per 100 inches of sheeting.

It is most important to note that the yarns of the textile lattice are wholly contained by plastic sheeting, and do not separate at their traversal points, and these yarns do not move laterally within the plastic sheeting.

Reinforced plastic sheeting according to the present invention is normally clear and translucent; however, if desired, it may be colored or may be made opaque by the use of suitable pigments. Additionally compatible heat stabilizers, antioxidants and ultraviolet stabilizers (such as those disclosed in copending patent application Ser. No. 341,614) etc., may be added.

A few of the many uses for this sheet material are as a glass substitute for window openings, particularly in greenhouses; as tarpaulin material for covering machinery, etc., as a ground covering for nurseries, as a barrier material placed under plastic floors and generally in other areas of the construction industry as a strong barrier against moisture.

While I have described and illustrated a preferred embodiment and practice of this present invention, I wish it understood that there is no intention to employ such restrictions but rather that all modifications thereof which would be apparent to one skilled in the art and which come within the sphere and scope of the appended claims are to be included.

What is claimed is:

1. The method of making a reinforced plastic sheet material which comprises the steps of coating yarns with a plastic, forming a textile lattice of said coated yarns and fusing said coated yarns at their intersections to form a fused lattice, laying said fused latice onto a preformed sheet of plastic material, extruding a semi-molten film of a plastic material onto said preformed sheet of plastic material and over said lattice, cooling a surface of said film sufficiently to form a solid film surface prior to application of laminating pressure, and pressing said lattice and plastic materials together to sandwich said lattice between said materials, thereby to bond said plastic materials to said lattice substantially entirely throughout each opening of said lattice to provide a reinforced plastic sheet having a burst strength of at least about 130 pounds per square inch and a tear strength of at least 7 pounds.

2. The method of making a reinforced plastic sheet material as defined in claim 1, wherein the coated yarns are coating-fused together at their intersections without creating intimate contact between their respective core yarns whereby abrasion between said respective core yarns is precluded.

3. The method of making a reinforced plastic sheet material as defined in claim 1, wherein the coating-fusing at the intersections of the coated yarns of the textile lattice takes place at a higher temperature than the temperature of the subsequent bonding of the plastic materials, whereby the coating-fusion is relatively unaffected by said subsequent bonding.

4. The method of making a reinforced plastic sheet material as defined in claim 3, wherein the bonding of the plastic materials takes place at a temperature below about 300° F.

References Cited

UNITED STATES PATENTS

| | | | |
|---|---|---|---|
| 3,442,750 | 5/1969 | Wilcox | 156—178 X |
| 3,444,024 | 5/1969 | Hillas | 156—178 X |
| 3,444,025 | 5/1969 | Hillas | 156—178 X |

CARL D. QUARFORTH, Primary Examiner

S. J. LECHERT, Jr., Assistant Examiner

U.S. Cl. X.R.

156—181, 244, 306